United States Patent
Al-Khalifa et al.

(10) Patent No.: US 11,371,342 B2
(45) Date of Patent: Jun. 28, 2022

(54) FLOW MONITORING TOOL

(71) Applicant: Saudi Arabian Oil Company, Dhahran (SA)

(72) Inventors: Mohammed Al-Khalifa, Dhahran (SA); Jinjiang Xiao, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 34 days.

(21) Appl. No.: 16/953,011

(22) Filed: Nov. 19, 2020

(65) Prior Publication Data

US 2021/0087928 A1    Mar. 25, 2021

Related U.S. Application Data

(63) Continuation-in-part of application No. 15/093,241, filed on Apr. 7, 2016, now abandoned.
(Continued)

(51) Int. Cl.
*E21B 47/135* (2012.01)
*E21B 47/10* (2012.01)
(Continued)

(52) U.S. Cl.
CPC ............ *E21B 47/135* (2020.05); *E21B 47/06* (2013.01); *E21B 47/07* (2020.05); *E21B 47/107* (2020.05);
(Continued)

(58) Field of Classification Search
CPC .. G10K 15/046; G01N 29/2418; G01N 29/34; A61B 5/0095; A61B 8/4483
See application file for complete search history.

(56) References Cited

U.S. PATENT DOCUMENTS

| 4,914,959 A | 4/1990 | Mylvaganam et al. |
| 6,100,969 A | 8/2000 | Perez |

(Continued)

FOREIGN PATENT DOCUMENTS

| EP | 0418224 A1 | 3/1991 | |
| WO | WO-0206813 A2 * | 1/2002 | ......... G01N 29/2418 |

(Continued)

OTHER PUBLICATIONS

Tian, Jiajun, Qi Zhang, and Ming Han. "Distributed fiber-optic laser-ultrasound generation based on ghost-mode of tilted fiber Bragg gratings." Optics express 21.5 (2013): 6109-6114.*

(Continued)

*Primary Examiner* — Herbert K Roberts
(74) *Attorney, Agent, or Firm* — Bracewell LLP; Constance G. Rhebergen; Linda L. Morgan

(57) ABSTRACT

A system for measuring conditions in a wellbore includes tubing extending into the wellbore. A high power laser having a power greater than 1 kW is operable to deliver a light to a first fiber optic cable. The first fiber optic cable extends axially along a fist surface portion of the tubing and has at least one signal generation gauge located at a predetermined location for producing a generated acoustic signal that propagates outward from the generation gauge and through the tubing. A second fiber optic cable extends axially along a second surface portion of the tubing and is operable to receive a resulting signal of the generated acoustic signal so that wellbore parameters proximate to the predetermined location can be determined. The second fiber optic cable is spaced apart from the first fiber optic cable and is operable to transmit data of the resulting signal to a receiver.

16 Claims, 2 Drawing Sheets

Related U.S. Application Data

(60) Provisional application No. 62/145,211, filed on Apr. 9, 2015.

(51) Int. Cl.

| | |
|---|---|
| *G01F 1/66* | (2022.01) |
| *G01H 9/00* | (2006.01) |
| *G01N 29/34* | (2006.01) |
| *G10K 15/04* | (2006.01) |
| *E21B 47/107* | (2012.01) |
| *E21B 47/07* | (2012.01) |
| *E21B 47/06* | (2012.01) |

(52) U.S. Cl.
CPC ............ *G01F 1/66* (2013.01); *G01H 9/004* (2013.01); *G01N 29/348* (2013.01); *G10K 15/046* (2013.01)

(56) References Cited

U.S. PATENT DOCUMENTS

| | | | |
|---|---|---|---|
| 6,341,652 B1 | 1/2002 | Malone et al. | |
| 8,789,587 B2 | 7/2014 | Tubel et al. | |
| 9,170,149 B2 | 10/2015 | Hartog et al. | |
| 2010/0107754 A1 | 5/2010 | Hartog et al. | |
| 2014/0204712 A1* | 7/2014 | Skinner .................. | G01H 9/004 367/81 |
| 2016/0177708 A1 | 6/2016 | Stokely | |

FOREIGN PATENT DOCUMENTS

| | | |
|---|---|---|
| WO | 2007143474 A1 | 12/2007 |
| WO | 2015026324 A1 | 2/2015 |
| WO | 2015057224 A1 | 4/2015 |
| WO | 2015080706 A1 | 6/2015 |

OTHER PUBLICATIONS

"Lasers generate underwater sound", Phys Org, Sep. 4, 2009, https://phys.org/news/2009-09-lasers-underwater.html.
Bai-Ou Guan, et al., "Ultrasonic Hydrophone Based on Distributed Bragg Reflector Fiber Laser", IEEE Photonics Technology Letters, vol. 16, No. 1, Jan. 2006, pp. 169-171.
International Search Report and Written Opinion for related PCT application PCT/US2016/026788 dated Jul. 20, 2016.
J.J. Xiao (SPE) et al., "Intelligent Distributed Acoustic Sensing for In-well Monitoring", Society of Petroleum Engineers, Apr. 21-24, 2014, pp. 1-12, SPE-172197-MS, Saudi Arabia.
Jones et al., "Remote Intense Laser Acoustic Source", Acoustics, 2007, NRL Review, pp. 121-123.
Kjetil Johannessen Statoil Asa, SPE et al., "Distributed Acoustic Sensing—A New Way of Listening to Your Well/Reservoir", Society of Petroleum Engineers, Mar. 27-29, 2012, pp. 1-9, SPE 149602, The Netherlands.
Li et al., "Laser Generation of Acoustic Waves in Liquids Using a Helmholtz Resonance Photoacoustic Cell", Proceedings of SPIE—The International Society for Optical Engineering, vol. 7156, Dec. 2008.
Liu Jiansheng, et al. "Study on Multiplexing Ability of Identical Fiber Bragg Gratings in a Single Fiber", Chinese Journal of Aeronautics 24, 2011, pp. 607-612.
Tian et al. "Distributed fiber-opic laser-ultrasound generation based on ghost-mode of tilted fiber Bragg gratings", Department of Eleclrical Engineering, Mar. 11, 2013, vol. 21, No. 5, Optics Express, pp. 6109-6114.

\* cited by examiner

FLOW MONITORING TOOL

CROSS REFERENCE TO RELATED APPLICATION

This application is a continuation in part of and claims priority to and the benefit of co-pending U.S. application Ser. No. 15/093,241 filed Apr. 7, 2016, titled "Flow Monitoring Tool," which claims priority to and the benefit of U.S. Provisional Application Ser. No. 62/145,211 filed Apr. 9, 2015, titled "Flow Monitoring Tool," the full disclosure of each of which is hereby incorporated herein by reference in its entirety for all purposes.

BACKGROUND OF THE DISCLOSURE

1. Field of the Disclosure

The present technology relates to oil and gas production. In particular, the present technology relates to measuring flow and other properties of fluid in a well.

2. Description of the Related Art

Measurement of fluid properties in a well can be useful to optimize production of oil and gas, as well as the injection of chemicals and other fluids into the well. Internal control valves (ICV) and inflow control devices (ICD) can be adjusted in response to such fluid properties to optimize production from the well. Similarly, measurement of flow rate in the production tubing of a well helps to determine whether a submersible pump or other equipment is functioning properly. Measurement of parameters such as pressure and temperature can also be useful to help control equipment based on real time conditions in the well.

Some known systems utilize venturi meters to measure flow in a well, and separate electronic sensors to measure parameters such as pressure and temperature. Use of a venturi meter and multiple sensors, however, can be problematic because such a system has multiple components, leading to increased possibility of failure of a component, which can lead to costly downtime to repair or replace components.

Other systems utilize passive acoustic sensing technology to "listen" to the fluid in a well to determine parameters like flow rate, pressure, and temperature. Such systems have limitations, however, in particular with regard to the ability to monitor silent flow (that is, flow that does not generate audible signals, such as through turbulence).

SUMMARY OF THE DISCLOSURE

Systems and method described in this disclosure provide a downhole flow sensing tool using two fiber optic cables for discrete audible or ultrasound generation and either distributed or discrete sensing. A first cable is used for generation and the second cable is used for sensing. The amount of signal generated is controlled and known, allowing precise comparison between the generated signal and the sensed signal. The comparison between generated and sensed signal will allow a more accurate measurement of flow parameters. By utilizing the active generation of audible or ultrasound signals, there are higher probabilities of flow detection even for silent flow. The two fiber optic cables are installed besides the tubing as it is being installed so there are no obstructions preventing wellbore access. Embodiments of this disclosure can be used for assessing well and artificial lift system performance.

In an embodiment of this disclosure, a system for measuring conditions in a wellbore includes tubing extending into the wellbore. A high power laser is operable to deliver a light to a first fiber optic cable, the high power laser having a power greater than 1 kW. The first fiber optic cable extends axially along a first surface portion of the tubing and has at least one signal generation gauge located at a predetermined location for producing a generated acoustic signal that propagates outward from the generation gauge and through the tubing. A second fiber optic cable extends axially along a second surface portion of the tubing and is operable to receive a resulting signal of the generated acoustic signal so that wellbore parameters proximate to the predetermined location can be determined. The second fiber optic cable is spaced apart from the first fiber optic cable and is operable to transmit data of the resulting signal to a receiver.

In alternate embodiments, the first fiber optic cable and the second fiber optic cable can extend substantially parallel to one another and the second surface portion of the tubing can be on an opposite side of the tubing from the first surface portion of the tubing. The generated acoustic signal can have a frequency of between about 1 mHz and about 100 kHz, and a dynamic range of about 50 dB or more. A penetrator can circumscribe the first fiber optic cable and be located within an annular packer between the tubing and the wellbore, the penetrator sealing between the first fiber optic cable and the annular packer.

In other alternate embodiments, the second fiber optic cable can have at least one signal detection point located at a discrete location along the second fiber optic cable or alternately, can be operable to receive the generated acoustic signal along a distributed length of the second fiber optic cable. The second fiber optic cable can be operable to receive an amplitude and a phase of the resulting signal. The wellbore parameters can be selected from a group consisting of pressure, temperature, phase fraction, and fluid flow rate.

In an alternate embodiment of this disclosure, a system for measuring conditions in a wellbore includes tubing extending into the wellbore. A high power laser is operable to deliver a light to a first fiber optic cable, the high power laser having a power greater than 1 kW. The first fiber optic cable extending axially along a the tubing and having at least one signal generation gauge for generating a generated acoustic signal that propagates outward from the at least one signal generation gauge. A second fiber optic cable can extend axially along an opposite side of the tubing from the first fiber optic cable and operable to receive a resulting signal of the generated acoustic signal after the generated acoustic signal passes through the tubing, wherein the first fiber optic cable and the second fiber optic cable are separate fiber optic cables and are spaced apart from each other. A receiver is in communication with the second fiber optic cable and is operable to receive data of the resulting signal, the data including at least one of an amplitude and a phase of the resulting signal.

In alternate embodiments, the receiver can be operable to determine at least one of a pressure, temperature, phase fraction, and fluid flow rate within the wellbore from the data of the resulting signal. The first fiber optic cable and the second fiber optic cable can be secured to a surface of the tubing. The second fiber optic cable can have a distributed length and be operable to receive the resulting signal along the distributed length.

In yet another alternate embodiment of this disclosure, a method for measuring conditions in a wellbore includes extending tubing into the wellbore, the tubing having a first fiber optic cable extending axially along a fist surface portion of the tubing and a second fiber optic cable extending axially along a second surface portion of the tubing, the second fiber optic cable being a separate cable spaced apart from the first fiber optic cable. A light is delivered to the first fiber optic cable with a high power laser, the high power laser having a power greater than 1 kW. A generated acoustic signal is generated with at least one signal generation gauge located at a predetermined location along the first fiber optic cable, the generated acoustic signal propagating outward from the at least one signal generation gauge and through the tubing. A resulting signal of the generated acoustic signal is received with the second fiber optic cable so that wellbore parameters proximate to the predetermined location can be determined. Data of the resulting signal is transmitted to a receiver with the second fiber optic cable.

In alternate embodiments, generating the generated acoustic signal can include generating the generated acoustic signal with a frequency of between about 1 mHz and about 100 kHz, and a dynamic range of about 50 dB or more. The second fiber optic cable can have at least one signal detection point located at a discrete location along the second fiber optic cable and receiving the resulting signal with the second fiber optic cable can include receiving the resulting signal with the at least one signal detection point. Alternately, receiving resulting signal with the second fiber optic cable can include receiving the resulting signal along a distributed length of the second fiber optic cable. Transmitting the data of the resulting signal to the receiver with the second fiber optic cable the second fiber optic cable can include transmitting an amplitude and a phase of the resulting signal. At least one of a pressure, temperature, phase fraction, and fluid flow rate within the wellbore can be determined from the data of the resulting signal.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE DISCLOSURE

Figure 1:
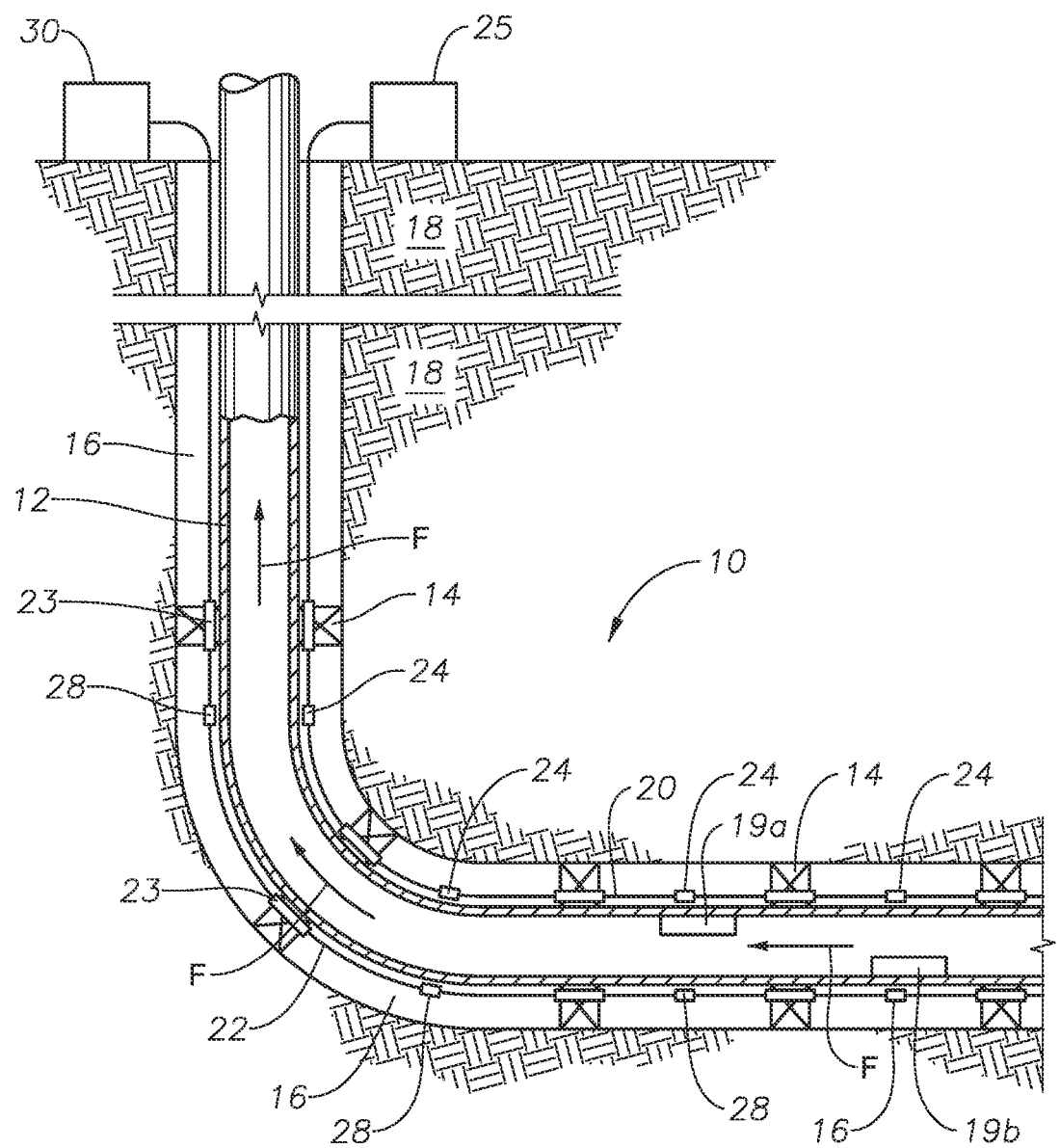
FIG. 1 is a side cross-sectional view of a wellbore, including a flow monitoring tool according to an embodiment of the present technology.

The foregoing aspects, features, and advantages of the present technology will be further appreciated when considered with reference to the following description of embodiments of this disclosure and accompanying drawings. In describing the embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose. In interpreting this disclosure, all terms should be interpreted in the broadest possible manner consistent within the context of each term. All technical and scientific terms used in this disclosure have the same meaning as commonly understood by one of ordinary skill in the art to which the invention belongs unless defined otherwise.

As used in this disclosure, the singular forms "a", "an" and "the" include plural references unless the context clearly indicates otherwise. The verb "comprises" and its conjugated forms should be interpreted as referring to elements, components or steps in a non-exclusive manner, and the invention illustrative disclosed suitably may be practiced in the absence of any element which is not specifically disclosed, including as "consisting essentially of" and "consisting of". The referenced elements, components or steps may be present, utilized or combined with other elements, components or steps not expressly referenced. "Operable" and its various forms means fit for its proper functioning and able to be used for its intended use. "Associated" and its various forms means something connected with something else because they occur together or that one produces the other. "Detect" and its conjugated forms should be interpreted to mean the identification of the presence or existence of a characteristic or property. "Determine" and its conjugated forms should be interpreted to mean the ascertainment or establishment through analysis or calculation of a characteristic or property. "Fluids" means vapors, liquids, gases and their combinations at their present condition unless otherwise stated.

Spatial terms describe the relative position of an object or a group of objects relative to another object or group of objects. The spatial relationships apply along vertical and horizontal axes. Orientation and relational words are for descriptive convenience and are not limiting unless otherwise indicated.

Where this disclosure provides a range of values, it is understood that the interval encompasses each intervening value between the first limit and the second limit as well as the first limit and the second limit. Embodiments of this disclosure include smaller ranges of the interval subject to any specific exclusion provided. "Substantial" and its derivatives means equal to or greater than 10% by the indicated unit of measure. Where this disclosure references a method comprising two or more defined steps, the defined steps can be carried out in any order or simultaneously except where the context excludes that possibility.

FIG. 1 is a side schematic view of a portion of a wellbore 10 having a tubing such as tubing string 12 running therethrough. At select intervals in the wellbore 10, packers 14 can surround the tubing string 12. One function of the packers 14 is to seal portions of the annulus 16 one from another, such as to contain wellbore fluid in one portion of the annulus 16 from moving to another portion of the annulus 16 separated by the packer 14. Within the annulus 16, fluid is free to flow as long as it is not impeded by a packer 14. Furthermore, in non-cased portions of the well, or portions of the well having a porous casing, such as a perforated casing, fluid can flow into the annulus from the formation 18.

During production of the well, the production fluid flows toward the top of the well through the tubing string 12, as indicated by arrows F. In some wells, the pressure may be sufficiently high that the production fluid flows toward the top of the well without assistance. In many wells, however, artificial lift techniques are used to lift the production fluid to the top of the well. Such techniques may include, for example, pumping the production fluid up the tubing string 12 using submersible pumps (not shown).

In addition, internal control valves (ICV) 19a and inflow control devices (ICD) 19b can be used in the well to enable optimization of the production and inflow rates of fluids in the wellbore. ICVs 19a are valves placed in predetermined locations in the well, and that regulate the hydrocarbon formation flow at such locations. They can be partially opened or closed to control the amount of hydrocarbon product produced from the formation. For example, they can be open at 100%, 75%, or less, and the amount that they are opened can typically be controlled from the surface. ICDs 19b, on the other hand, are typically more passive control devices, where only one pre-determined position can be achieved (that is, they cannot be partially opened and closed like the ICVs 19a). In practice, ICDs 19b are typically used where a formation has different permeability in different parts of the formation, so that one part of the formation is more productive than another part in the same well. ICDs 19b can be used to regulate the flow in one part of the well vis-à-vis another to provide a more uniform flow between the parts. Such uniform flow can be beneficial to prevent problems such as water encroaching into a well through a highly permeable section, thereby decreasing recovery.

Accordingly, the ICVs 19a can help to increase hydrocarbon recovery and prevent unwanted fluid production. The ICDs 19b can be positioned to optimize the water flood profile. Although the operations of such devices as ICVs 19a and ICDs 19b is well understood, the optimization of the devices in-situ is complex, and relies in part on accurate information about flow and other parameters. In fact, the real-time monitoring of fluid flow along the wellbore can provide valuable information to set the position of the inflow devices and optimize the fluid flow in multilateral zones.

Accordingly, it can be advantageous to monitor certain parameters of the production fluid as it flows through the tubing string 12. Such parameters can include, for example, the phase fraction, pressure, temperature, or flow rate of the production fluid. Knowledge of these parameters can lead to adjustment of equipment, such as a submersible pump, ICVs, or ICDs as necessary to optimize production and avoid unsafe conditions in the well.

Figure 2:
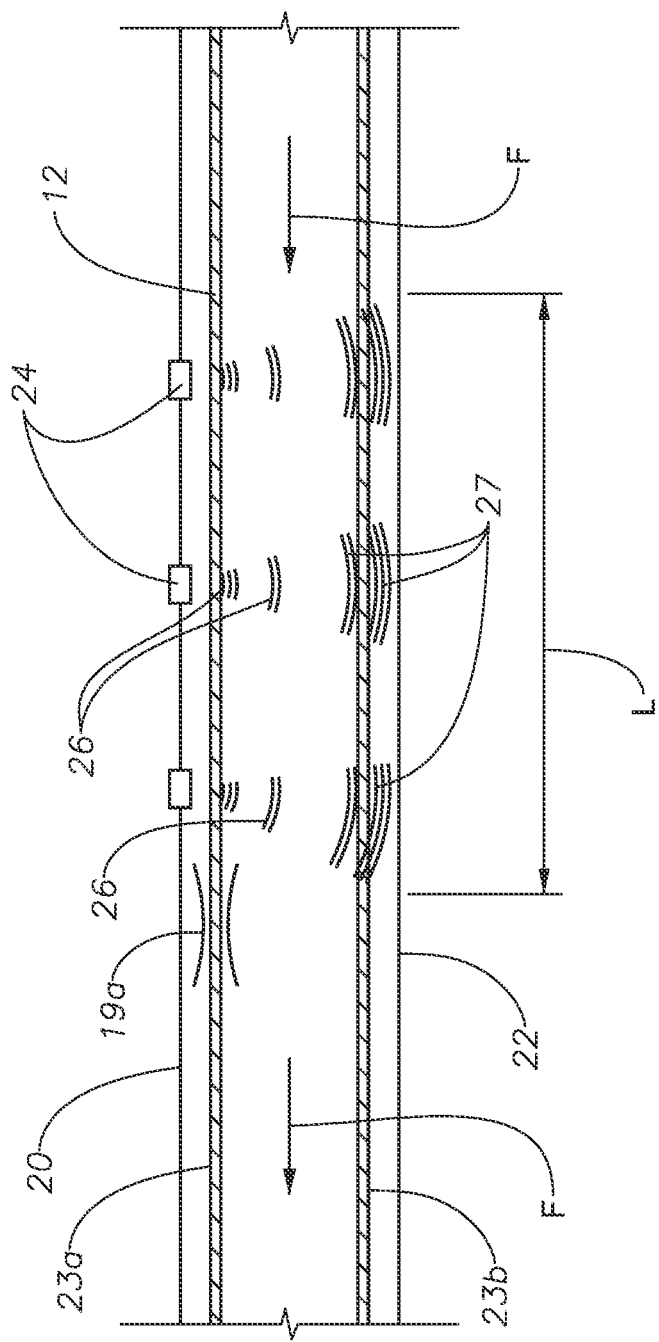
FIG. 2 is an alternate view of the system of FIG. 1, and further showing signals generated and received by the present technology.

To this end, the present technology includes the use of a first fiber optic cable 20 and a second fiber optic cable 22 to monitor well conditions as described in this application. First fiber optic cable 20 extends axially along a first surface portion 23a of tubing 12 and second fiber optic cable 22 can extend axially along a second surface portion 23b of tubing 12. First fiber optic cable 20 and second fiber optic cable 22 can be secured to a surface of tubing string 12. First fiber optic cable 20 and second fiber optic cable 22 can extend substantially parallel to one another. The second surface portion 23b of tubing 12 can be on an opposite side of the tubing 12 from the first surface portion 23a of tubing 12 so that first fiber optic cable 20 and second fiber optic cable 22 are on opposite sides of tubing 12. In the example of FIG. 2, first surface portion 23a and second surface portion 23b are both an exterior surface of tubing 12. In alternate embodiments, first surface portion 23a and second surface portion 23b can be inner diameter surfaces of tubing 12, or first surface portion 23a and second surface portion 23b can be surfaces of bores that extend through the sidewall of tubing 12.

First fiber optic cable 20 and second fiber optic cable 22 are separate fiber optic cables and can be spaced apart from each other so that they are not in contact with each other. Fiber optic cables 20, 22 can be protected across couplings of the tubing string over the length of the tubing to prevent potential damage during run in hole (RIH) operations. In order to pass through packer 14 or other members within annulus 16, first fiber optic cable 20 and second fiber optic cable 22 can include penetrator 23. Penetrator 23 can help the fiber optic cables 20, 22 pass through such objects. Penetrator 23 can circumscribe first fiber optic cable 20 or second fiber optic cable 22 and be located within packer 14, sealing between the fiber optic cable 20, 22 and packer 14. Alternately, fiber optic cables 20, 22 can be encased inside metal tubes that are attached and secured to the tubing string from the outside.

First fiber optic cable 20 can include at least one signal generating gauge 24 for producing generated acoustic signals 26, or pulses (shown in FIG. 2). The signals can be acoustic signals, and can be either ultrasound or audible. In some embodiments, generated acoustic signals 26 can be generated at multiple predetermined locations along the first fiber optic cable 20. Generated acoustic signals 26 can propagate outward from signal generation gauges 24 and through tubing 12. The signals can be generated based on a predetermined light tapping pattern that only taps out the light of a particular predetermined wavelength for laser ultrasound generation. Longer wavelengths can provide the advantage of passing through wellbore fluids and other components without a loss or with very minimal loss.

Under flowing condition, the downhole environment can be noisy. A high power laser 25 can generate the light that is delivered through first fiber optic cable 20. High power laser 25 be located at the earth's surface outside of annulus 16. High power laser 25 can deliver the needed laser power and can generate the required signal strength over a distance of several kilometers. High power laser 25 can have, for example, a power greater than 1 kW. In alternate embodiments, high power laser 25 can have a power in a range of 10-20 kW. High power laser 25 can be a currently available laser with a power greater than 1 kW. In alternate embodiments, high power laser 25 can be a currently available laser with a power in a range of 10-20 kW. As a non-limiting example, high power laser 25 can be a laser such as those available from a laser retailer such as Foro Energy.

High powered laser 25 can generate light with a wavelength of 1 to 1.5 micrometers. Each signal generation gauge 24 can tap out a portion of such laser light of a particular wavelength or a range of wavelengths. Each signal generation gauge 24 can tap out light of a different wavelength than any of the other signal generation gauges 24. The light that is not tapped out of first fiber optic cable 20 by a generation gauge 24 will continue to travel through first fiber optic cable 20.

In addition to using high power laser 25, first fiber optic cable 20 must be operable to deliver the light generated by high power laser 25 to signal generating gauge 24. As an example, first fiber optic cable 20 can be formed with a fiber core diameter size in a range of 300 to 1000 microns. First fiber optic cable 20 can be protected externally from mechanical and chemical damages in downhole conditions.

As an example, generated acoustic signals 26 can be signals having a wide frequency, such as a frequency of about 1 mHz to about 100 kHz, and a high dynamic range, such as a range of about 50 dB or greater. In alternate embodiments, the high dynamic range can be a range between 50 dB and 120 dB. If an acoustic signal has a higher frequency or a lower dynamic range, than embodiments of this disclosure, the acoustic signal will attenuate and be significantly weakened before reaching second fiber optic cable 22.

The second fiber optic cable 22 can receive or intercept the resulting signals 27 of the generated acoustic signals 26 emitted by the signal generating gauges 24 of the first fiber optic cable 20. Second fiber optic cable 22 can also be protected externally from mechanical and chemical damages in downhole conditions. Resulting signals 27 are signals that originated as generated acoustic signals 26 then traveled through tubing 12 and fluids and any other materials within tubing 12, before reaching second fiber optic cable 22. Fiber optic cable can receive, for example, features of resulting signals 27 such as amplitude and phase of resulting signals 27. Because the features of generated acoustic signal 26 are controlled and known, by comparing the features of generated acoustic signal 26 and resulting signals 27 can allow for accurate determination of parameters such as of pressure, temperature, phase fraction, or fluid flow rate of the fluids within tubing 12.

Looking at the embodiment of FIG. 2, second fiber optic cable 22 can receive resulting signals 27 along a distributed length L of second fiber optic cable 22. Having distributed length L of second fiber optic cable 22 allows for an analyses to be performed with information collected from resulting signals 27 over the entire distributed length L of second fiber optic cable 22 to capture a more accurate acoustic picture of the flow through tubing 12.

In the alternate embodiment of FIG. 1, second fiber optic cable 22 can have at least one signal detection point 28 located at a discrete location along second fiber optic cable 22. Signal detection points 28 can then employ digital optoelectronics detection techniques to capture the resulting signals 27, and then second fiber optic cable 22 can transmit data about the signal to receiver 30. In such an embodiments, fluid parameters proximate to the locations of signal detection points 28 can be discretely collected and analyzed.

The present disclosure therefore contemplates the use of both discrete and distributed detection of resulting signals 27, as determined by the needs and circumstances related to operation of a particular well. Discrete detection signals can be more practical and easier to implement, as they involve sensors at only predetermined discrete places in the well bore. In certain embodiments, discrete sensing can be achieved through the use of fiber Bragg grating (FBG) sensors. Distributed sensing, on the other hand, can be more comprehensive, giving a broader profile of the flow along the entire wellbore because it is not limited to discrete points. Instead, distributed sensing is achieved through the cable itself and isn't controlled or limited. The flow conditions in the well can affect glass fibers in the well, and locally change the characteristics of light transmission in the fiber. As a result of the damping of the light in the quartz glass fibers through scattering, the location of an external physical effect can be determined so that the optical fiber can be employed as a linear sensor.

In practice, the first and second fiber optic cables 20, 22 can be installed beside the tubing string 12 as the tubing is installed. Fiber optic cables 20, 22 can be, for example, secured to an outside of tubing 12. Thus, at the time the cables are installed, there is no obstruction preventing wellbore access.

One example of how the embodiments of this disclosure can help to overcome shortcomings of the previously known technologies is the problems faced in existing wells with venturi meters. In some wells, flow control devices are used to control the flow from different compartments in the well having different productivity. Such flow control devices typically include flow monitoring through a venturi meter and electronic sensors, and flow control through electrical adjustment of a flow control valve. The venturi meter can be used to measure flow, while the additional electronic sensors can measure parameters such as pressure and temperature. Thus, flow monitoring relies on the venturi meter and other electronic sensors.

The system and method described in the application can improve the reliability of flow monitoring by replacing the venturi meter and electronic sensors with the first and second fiber optic cables 20, 22, thereby eliminating the need for the venturi meter and other electronic meters. This simplifies the system, and makes it more reliable.

Although the technology described in the application has been described with reference to particular embodiments, it is to be understood that these embodiments are merely illustrative of the principles and applications of the present technology. For example, although the embodiments have been described as relates to use of the present technology in monitoring flow in production tubing, the technology can also be used to monitor flow in other applications, such as injection tubing. In addition, the embodiments shown and described above involve use of the technology in a mother bore of a well. The technology could also be applied, however, to lateral bores. For example, a fiber optical wet connect could be used to tie back the fiber optic ion on the lateral to the mother bore and to the surface. It is therefore to be understood that numerous modifications can be made to the illustrative embodiments and that other arrangements can be devised without departing from the spirit and scope of the present technology as defined by the appended claims.

What is claimed is:

1. A system for measuring conditions in a wellbore, the system comprising:
    tubing extending into the wellbore;
    a high power laser operable to deliver a light to a first fiber optic cable, the high power laser having a power greater than 1 kW;
    the first fiber optic cable extending axially along a first surface portion of the tubing and having a plurality of signal generation gauges for producing a generated acoustic signal by tapping out a light of a predetermined wavelength of the first fiber optic cable, each of the plurality of signal generation gauges located at a separate predetermined location spaced apart from each other of the plurality of signal generation gauges, said generated acoustic signal propagating outward from the signal generation gauge and through the tubing, and where the plurality of signal generation gauges are operable to provide the generated acoustic signal that has a frequency of between 1 mHz and 100 kHz, and a dynamic range between 50 dB and 120 dB; and
    a second fiber optic cable extending axially along a second surface portion of the tubing and operable to receive a resulting signal of the generated acoustic signal so that wellbore parameters proximate to the predetermined location can be determined, the second fiber optic cable being spaced apart from the first fiber optic cable and being operable to transmit data of the resulting signal to a receiver.

2. The system of claim 1, wherein the first fiber optic cable and the second fiber optic cable extend substantially parallel to one another and wherein the second surface portion of the tubing is on an opposite side of the tubing from the first surface portion of the tubing.

3. The system of claim 1, further comprising a penetrator circumscribing the first fiber optic cable and located within an annular packer between the tubing and the wellbore, the penetrator sealing between the first fiber optic cable and the annular packer.

4. The system of claim 1, wherein the second fiber optic cable has at least one signal detection point located at a discrete location along the second fiber optic cable.

5. The system of claim 1, wherein the second fiber optic cable is operable to receive the generated acoustic signal along a distributed length of the second fiber optic cable.

6. The system of claim 1, wherein the second fiber optic cable is operable to receive an amplitude and a phase of the resulting signal.

7. The system of claim 1, wherein the wellbore parameters are selected from a group consisting of pressure, temperature, phase fraction, and fluid flow rate.

8. A system for measuring conditions in a wellbore, the system comprising:
- tubing extending into the wellbore;
- a high power laser operable to deliver a light to a first fiber optic cable, the high power laser having a power greater than 1 kW;
- the first fiber optic cable extending axially along the tubing and having a plurality of signal generation gauges for producing a generated acoustic signal by tapping out a light of a predetermined wavelength of the first fiber optic cable, said generated acoustic signal propagating outward from each of the plurality of signal generation gauges, each of the plurality of signal generation gauges located at a separate predetermined location spaced apart from each other of the plurality of signal generation gauges, and where the plurality of signal generation gauges are operable to provide the generated acoustic signal that has a frequency of between 1 mHz and 100 kHz, and a dynamic range between 50 dB and 120 dB;
- a second fiber optic cable extending axially along an opposite side of the tubing from the first fiber optic cable and operable to receive a resulting signal of the generated acoustic signal after the generated acoustic signal passes through the tubing, wherein the first fiber optic cable and the second fiber optic cable are separate fiber optic cables and are spaced apart from each other; and
- a receiver in communication with the second fiber optic cable and operable to receive data of the resulting signal, the data including at least one of an amplitude and a phase of the resulting signal.

9. The system of claim 8, wherein the receiver is operable to determine at least one of a pressure, temperature, phase fraction, and fluid flow rate within the wellbore from the data of the resulting signal.

10. The system of claim 8, wherein the first fiber optic cable and the second fiber optic cable are secured to a surface of the tubing.

11. The system of claim 8, wherein the second fiber optic cable has a distributed length and is operable to receive the resulting signal along the distributed length.

12. A method for measuring conditions in a wellbore, the method comprising:
- extending tubing into the wellbore, the tubing having a first fiber optic cable extending axially along a first surface portion of the tubing and a second fiber optic cable extending axially along a second surface portion of the tubing, the second fiber optic cable being a separate cable spaced apart from the first fiber optic cable;
- delivering a light to the first fiber optic cable with a high power laser, the high power laser having a power greater than 1 kW;
- generating a generated acoustic signal with a plurality of signal generation gauges that produce the generated acoustic signal by tapping out a light of a predetermined wavelength of the first fiber optic cable, each of the plurality of signal generation gauges located at a separate predetermined location spaced apart from each other of the plurality of signal generation gauges along the first fiber optic cable, the generated acoustic signal propagating outward from the at least one signal generation gauge and through the tubing, and where the plurality of signal generation gauges are operable to provide the generated acoustic signal that has a frequency of between 1 mHz and 100 kHz, and a dynamic range between 50 dB and 120 dB;
- receiving a resulting signal of the generated acoustic signal with the second fiber optic cable so that wellbore parameters proximate to the predetermined location can be determined; and
- transmitting data of the resulting signal to a receiver with the second fiber optic cable.

13. The method of claim 12, wherein the second fiber optic cable has at least one signal detection point located at a discrete location along the second fiber optic cable and receiving the resulting signal with the second fiber optic cable includes receiving the resulting signal with the at least one signal detection point.

14. The method of claim 12, wherein receiving resulting signal with the second fiber optic cable includes receiving the resulting signal along a distributed length of the second fiber optic cable.

15. The method of claim 12, wherein transmitting the data of the resulting signal to the receiver with the second fiber optic cable includes transmitting an amplitude and a phase of the resulting signal.

16. The method of claim 12, further comprising determining at least one of a pressure, temperature, phase fraction, and fluid flow rate within the wellbore from the data of the resulting signal.

* * * * *